(12) United States Patent
Opfel

(10) Patent No.: US 6,854,421 B2
(45) Date of Patent: Feb. 15, 2005

(54) ANIMAL LITTER AND METHODS OF FABRICATING SAME

(75) Inventor: William Opfel, Mesa, AZ (US)

(73) Assignee: Equidry Bedding Products, LLC, Phoenix, AZ (US)

(*) Notice: Subject to any disclaimer, the term of this patent is extended or adjusted under 35 U.S.C. 154(b) by 0 days.

(21) Appl. No.: 10/120,858

(22) Filed: Apr. 10, 2002

(65) Prior Publication Data

US 2003/0209203 A1 Nov. 13, 2003

(51) Int. Cl.[7] ............................................. A01K 1/01
(52) U.S. Cl. ........................................................ 119/173
(58) Field of Search ................................. 119/173, 171; 501/80, 81, 82, 83

(56) References Cited

U.S. PATENT DOCUMENTS

| | | | |
|---|---|---|---|
| 2,649,759 A | | 10/1953 | Gibbs |
| 3,286,691 A | | 11/1966 | McFadden |
| 3,891,382 A | | 6/1975 | Lawall et al. |
| 4,337,283 A | | 6/1982 | Haas, Jr. |
| 4,459,368 A | | 7/1984 | Jaffee et al. |
| 4,628,042 A | | 12/1986 | Speronello |
| 4,824,810 A | * | 4/1989 | Lang et al. ................. 501/84 |
| 5,000,115 A | | 3/1991 | Hughes |
| 5,013,349 A | | 5/1991 | Tanaka |
| 5,109,805 A | | 5/1992 | Baldry et al. |
| 5,151,123 A | | 9/1992 | Kviesitis |
| 5,177,036 A | * | 1/1993 | Kunst et al. ................. 501/84 |
| 5,276,205 A | | 1/1994 | Fisher |
| 5,329,880 A | * | 7/1994 | Pattengill et al. ........... 119/171 |
| 5,358,607 A | * | 10/1994 | Ellis ............................ 162/100 |
| 5,402,752 A | * | 4/1995 | Hahn et al. .................. 119/173 |
| 5,418,195 A | * | 5/1995 | Kostuch et al. .............. 501/80 |
| 5,503,111 A | | 4/1996 | Hughes |
| 5,507,250 A | | 4/1996 | Reddy et al. |
| 5,577,463 A | * | 11/1996 | Elazier-Davis et al. ..... 119/173 |
| 5,634,431 A | * | 6/1997 | Reddy et al. ................ 119/173 |
| 6,019,063 A | * | 2/2000 | Haubensak et al. ......... 119/173 |
| 6,155,749 A | * | 12/2000 | Tanner et al. .............. 405/258.1 |
| 6,287,550 B1 | | 9/2001 | Trinh et al. |
| 6,358,312 B1 | * | 3/2002 | Tanner et al. ................ 106/416 |

* cited by examiner

Primary Examiner—Yvonne R. Abbott
(74) Attorney, Agent, or Firm—Schmeiser Olsen & Watts, LLP

(57) ABSTRACT

An improved animal litter with granules having high hardness coupled with high absorbency, thereby rendering the animal litter long lasting and durable, dust and odor free, easy to clean and maintain, and inexpensive in contrast to conventional animal litters. The improved animal litter is a composition comprising granules having calcium bentonite clay, illite clay, and/or kaolinite clay. A method of fabricating the improved animal litter includes the step of providing a composition comprising granules having calcium bentonite clay, illite clay, and/or kaolinite clay. Additional steps may also be included, namely: crushing the composition; screening the composition; kilning the composition; and washing the composition.

61 Claims, 5 Drawing Sheets

ANIMAL LITTER AND METHODS OF FABRICATING SAME

BACKGROUND OF THE INVENTION

1. Technical Field

This invention generally relates to animal husbandry, and more specifically relates to animal litter and methods of fabricating the same.

2. Background Art

In order to maintain health, stalled animals (i.e., animals placed in any form of confinement) and animals using litter boxes require appropriate litter and diligent litter maintenance. Use of appropriate litter and maintenance helps to reduce the presence of air contaminants (e.g. irritating gases from decomposing animal waste, ammonia odors, dust, and molds) and the moisture content from animal waste that lead to respiratory ailments and diseases, allergies, and other sanitation problems such as hair loss, rashes, and the like. Litter materials used for stall floors and litter boxes greatly influence air quality, ease of stall or litter box maintenance, and animal waste and odor removal. Stall floors or litter boxes should have litter material that is, among other standards: not slippery; absorbent; dry; easy to clean and maintain; resistant to pawing; long lasting and durable; dust and odor free; and inexpensive.

However, by way of example, conventional litter materials for horses, such as organic materials, sand, clay, sand/clay mixture, limestone dust, wood, concrete, asphalt, rubber floor mats, volcanic cinders, baking soda, zeolites, and potassium dichromate, do not meet these standards and have many problems. Particularly, organic materials (straw, alfalfa, grass, sawdust, wood shavings, etc.) have a low absorbency, and the low weight small particles easily become airborne resulting in horse respiratory distress, while larger particles (e.g. shavings) blow around and out of the stall. In addition, organic litter is very dusty, both initially, and as horse manure fines build up. Organic litter also requires removal of all of the organic litter to remove the manure fines. Furthermore, many animals over time develop allergic reactions to the organic materials and organic materials do not control odors. Ammonia odors are not locked into or tied up by the organic materials, so ammonia releases are usually very strong with little or no attempt at storage of the odor causing agents. In addition, horse stalls are typically overwhelmed with 15–30 gallons of urine and 10–20 pounds of manure per day. Poorly absorbent organic materials are easily overwhelmed by the sheer volume of waste necessitating removal of stall contents. However, there are limited disposal options for urine and manure-soaked organic litter. Additionally, the costs of purchasing organic materials for horse litter have increased as other industries compete for these organic materials (e.g. paper production, pressed wood boards, etc.). Finally, organic materials are flammable, as evidenced by as many as 4,500 barn fires in the year 2001.

Stalls using only sand must be cleaned regularly and the sand changed regularly. It is a poor litter choice for many horses due to dust and the potential for colic. Conventional clay floorings or clay/sand mixture floorings require relatively high maintenance and do not provide dust free environments because of the inadequate hardness of the clay materials. Conventional clay materials are not long lasting, and attrition leads to additional dust as the clay material ages in the stall. In addition, packed clay floors tend to become slippery when wet, and maintaining level clay floors is difficult and time consuming. Furthermore, when horses urinate and then paw or move about the stall, holes and pockets develop in both the clay and clay/sand mixture floorings. Stall cleaning becomes difficult and drainage and odor problems often result.

Stall floors constructed of limestone dust inhibit ammonia odors. Limestone dust is usually placed over sand to allow adequate drainage, and the lime flooring is watered and packed before use. However, as installed, this flooring is not safe for use around people or horses. Lime flooring often has the same colic problems associated with sand, clay, and clay/sand mixture floors. In addition, lime is strongly alkaline and may cause drying and irritation of skin and respiratory organs. A horse fed off lime flooring may develop damage to its mouth, throat, and internal organs. Horses may also develop rashes from contact with lime. Furthermore, lime flooring is often as hard as concrete floors, and additional litter (straw, sawdust, wood shavings, stone dust, sand, clay, soil, etc.) is required to provide sufficient bedding/cushioning for horses.

Wooden floors are expensive, require chemical treatment to retard decay, are slippery when wet, and require additional litter to provide sufficient cushioning for horses and to absorb urine and avoid odor. Concrete or asphalt stall flooring have very poor drainage, are often cold and slippery, and additional litter is necessary to absorb urine and avoid odor, traction, and increased leg problems. Rubber stall mats, rubber paving bricks, and fiber-reinforced polyethylene interlocking blocks also are expensive and also require additional litter to absorb urine and avoid odor.

Horse litter produced from volcanic cinders (siliceous materials) is very dusty to begin with, and even more dust is created by attrition because large closed pores (fossil gas bubbles) make cinders soft with a low crush strength, thereby providing a respirable silica dust hazard. Volcanic cinders also have low absorbency. The large closed pores on a cinder do not have sufficient chemical-electrical attraction and large surface areas to absorb urine and avoid odor.

Baking soda is safer to use and more effective than lime at reducing odors. However, it has almost no absorbency, which would require large amounts to be used in a stall. Baking soda and 15–30 gallons of urine would become sticky and contribute to a stall moisture problem.

Zeolite products have the disadvantage that they are difficult to produce without dust. Most zeolites are absorbent, but lack the degree of hardness necessary to insure that they will not grind to dust under a horse's hooves.

Potassium dichromate serves to kill odor-producing bacteria and neutralize organic molecules that produce odors. However, although potassium dichromate reduces odors, it is not hard (grinds to dust under a horse's hooves) and is toxic in certain situations.

Therefore, what is needed is a highly hard, long lasting and durable, highly absorbent, dust and odor free, easy to clean and maintain, inexpensive animal litter, in contrast to conventional animal litters.

DISCLOSURE OF THE INVENTION

The present invention may be readily adapted to a variety of animal litters that may be, among other characteristics: highly hard, long lasting and durable; highly absorbent; dust and odor free; easy to clean and maintain; and inexpensive. Generally, the present invention provides an animal litter composition comprising granules having calcium bentonite clay, illite clay, and/or kaolinite clay. An animal litter fabrication method of the invention may generally include the step of: providing a composition comprising granules having calcium bentonite clay, illite clay, and/or kaolinite clay. Additional steps may also be included, namely: crushing the composition; screening the composition; kilning the composition; and washing the composition.

As will be made clear, important advantages of animal litter in accordance embodiments of the invention relate to hardness and absorbency. In various embodiments of the invention, calcium bentonite, illite, and/or kaolinite are combined in ratios (along with moisture and atmospheric gases) and flash kilned to provide an animal litter with granules having high hardness coupled with high absorbency. Neither minimum hardness nor minimum absorbency may be sacrificed if the animal litter is to function effectively. Depending upon the weight of the animal, inadequate hardness will result in the litter breaking down to powder/dust as it supports the animal. Without the designed absorbency, wicking properties will not be maximized and the animal litter will not function to quickly remove moisture from the stall or litter box environment.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings, where like designations denote like elements, and.

DESCRIPTION OT THE INVENTION

It will be understood by those of ordinary skill in the art that the invention is not limited to uses relating to horses, such as horse stalls, trailers, barns, corrals, arenas, and the like. Rather, any description relating to horses is for the exemplary purposes of this disclosure, and those of ordinary skill in the art will also understand that the invention may also be used in a variety of applications with similar results for a variety of animals, such as in litter boxes, stalls, cages, or the like of animals including, among others: household pets such as cats, dogs, gerbils, guinea pigs, mice, rats, and hamsters; other pets such as rabbits, ferrets, skunks; laboratory animals; farm animals, such as chickens, goats, sheep, cows, elk, and deer; and zoo animals.

Figure 1:
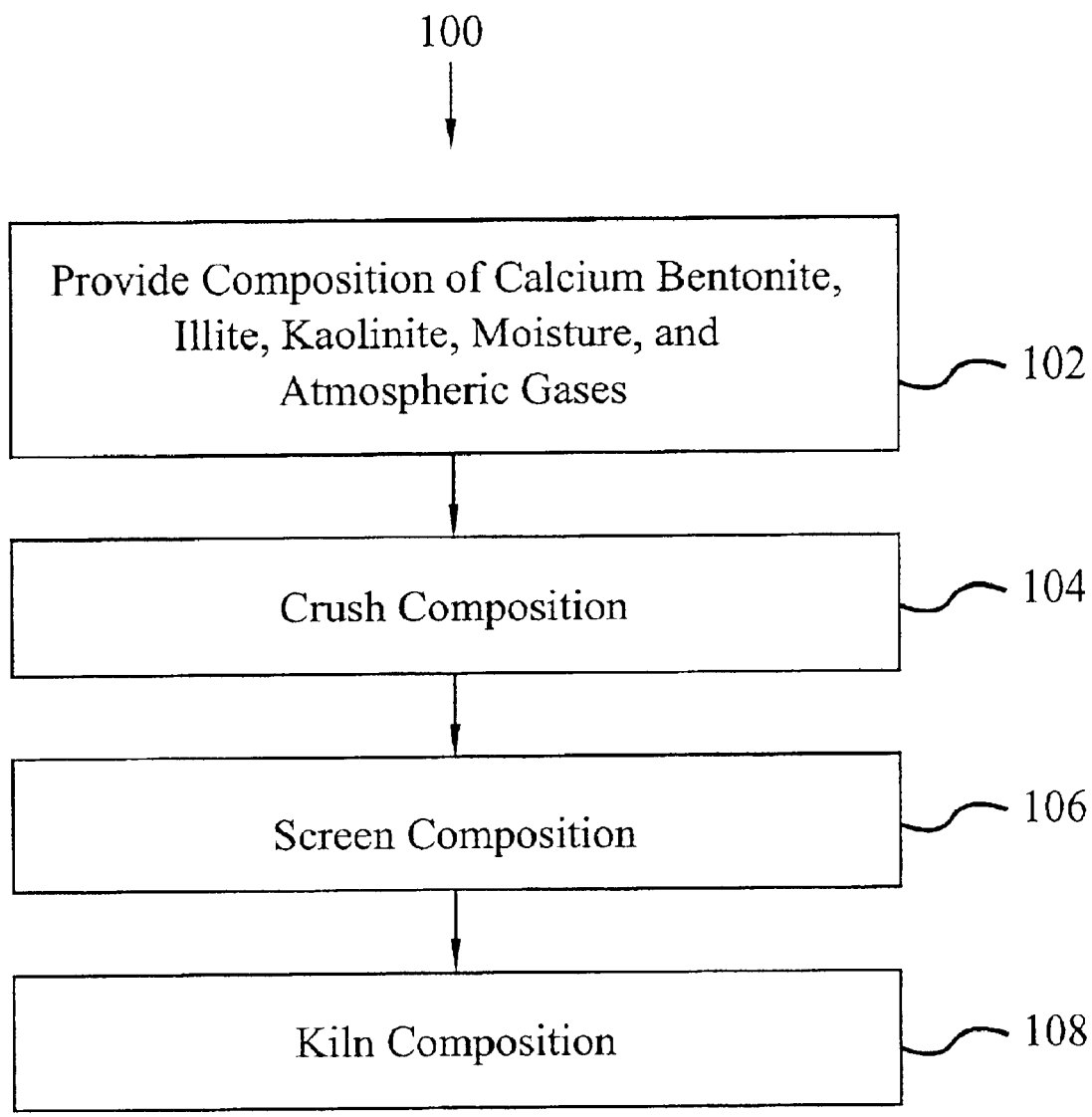
FIG. 1 is a flow diagram illustrating a fabrication method according to an embodiment of the invention.

Turning now to FIG. 1, exemplary fabrication method 100 for forming an animal litter composition in accordance with embodiments of the invention is illustrated. Generally, and for the exemplary purposes of this disclosure, method 100 may form an animal litter composition by: providing a composition comprising granules having calcium bentonite clay, illite clay, and/or kaolinite clay; crushing the composition; screening the composition; and kilning the composition.

Accordingly, step 102 of method 100 is to provide a composition comprising granules having calcium bentonite clay, illite clay, and/or kaolinite clay. Bentonite, which is a montmorillonite or smectite clay, is formed of hydrous magnesium aluminum silicate. A montmorillonite is capable of both absorption and adsorption of water. Absorption is water retention due to porosity. Adsorption is the attraction of liquid molecules to a surface through electrical bonding. Two common forms of bentonite exist, sodium bentonite and calcium bentonite, and they are distinguished by having a preponderance of either sodium or calcium cations. Calcium bentonite is the least swelling of the two bentonite types (when water is introduced), and is also the better absorbent. Calcium bentonite is an acid-activatable clay that may be treated with hydrochloric acid or sulfuric acid to significantly increase its surface area and enhance its absorptive properties, especially when the animal litter is to be used for smaller animals. The animal litter may be manufactured to be alkaline or acidic as the individual need dictates.

Illite clays are mica-like clay minerals which have no expansion characteristics upon wetting. Illite clays usually have potassium ions locking their crystal lattices in place. Kaolinite is a hydrated aluminum silicate. Kaolinite is typically low in iron and are often white in color. Kaolinite has the ability to withstand high temperatures in firing and is useful for bonding.

The calcium bentonite clay, the illite clay, and the kaolinite clay may be respectively combined in any percentage by weight depending upon the particular needs of an application, and may be verified by X-Ray diffraction techniques well known to those of ordinary skill in the art. In various embodiments of the invention, calcium bentonite, illite, and/or kaolinite are combined in percentages by weight greater than contaminate amounts so that the animal litter may function effectively. Contaminate levels in clays are typically less than 2% by weight.

Accordingly, for example, the calcium bentonite clay, the illite clay, and the kaolinite clay may be respectively combined in a percentage by weight of approximately 72%:17%:11% to approximately 15%:29%:56%. Different percentages by weight affect absorbancy and hardness. Comparatively high kaolinite percentage mixes result in materials of moderate absorbency and low hardness with a high tendency for dustiness. Comparatively high illite percentage mixes result in materials of high absorbancy and low hardness with a high tendency for dustiness. Comparatively high calcium bentonite percentage mixes result in materials of moderate absorbancy and high hardness. Thus, a comparatively high calcium bentonite percentage maximizes both absorbency and hardness with lower dustiness and may be useful in horse stall applications. A comparatively low calcium bentonite percentage maximizes absorbancy and is useful in a setting where hardness and dust are less of a concern, such as in pet litter boxes.

However, in other embodiments of the invention, the composition may comprise granules having calcium bentonite clay and one of kaolin clay and illite clay. Calcium bentonite clay and one of kaolin clay and illite clay may be respectively combined in any percentage by weight depending upon the particular application. Accordingly, for example, the calcium bentonite clay and one of the illite clay and the kaolinite clay may be respectively combined in a percentage by weight of approximately 85%:15% to approximately 15%:85%. Again, different percentages by weight affect absorbancy and hardness and may be used in various applications from large animal stalls to small animal litter boxes.

In still other embodiments of the invention, the composition may comprise granules having calcium bentonite clay, illite clay, kaolinite clay, chlorite clay, and other minor constituents, such as quartz, calcite, K-feldspar, hematite, plagioclase, and unaccounted materials. Accordingly, for example, the calcium bentonite clay, the illite clay, the kaolinite clay, the chlorite clay, the quartz, the calcite, the K-feldspar, the hematite, the plagioclase, and the unaccounted materials may be respectively combined in a percentage by weight of approximately 48%:11%:7%:0%:10%:4%:2%:12%:3%:3% to approximately 8%:12%:27%:5%:29%:5%:4%:0%:7%:3%.

In step 102, the calcium bentonite clay, the illite clay, and the kaolinite clay may be provided in the form of a clay brick, tile, pottery, or other similar products that comprise a mixture of the three clay types. Alternatively, the calcium bentonite clay, the illite clay, and the kaolinite clay may be excavated as a naturally occurring mixture of the three clay types. Additionally, the calcium bentonite clay, the illite clay, and the kaolinite clay may be excavated and then selectively mixed together to form granules of select compositions in accordance with embodiments of the invention. Calcium bentonite may be excavated by surface removal. The raw clay material may then be disced in place, followed by a weathering of clay chunks to effect a breakdown in overall size.

Accordingly, step 102 may further include additional steps depending upon whether the calcium bentonite clay, the illite clay, and the kaolinite clay need to be mixed together or not. Whether the mixture of the calcium bentonite clay, the illite clay, and the kaolinite clay is naturally occurring or is formed from the mixing of the clay types, step 102 may further include providing moisture and/or atmospheric gas as part of the composition of the invention. Moisture may be in the form of water and/or any other suitable liquid for example. Moisture may be added to swell the clay mixture, providing for increased surface area and porosity. Atmospheric gases may include $O_2$, $N_2$, or any combination thereof for example. Such gases may be entrained or mixed with water to assist in bloating. Depending upon the amount of admixed water and atmospheric gases, the clay mixture may be bloated as much as 500%.

If the various clay types have to be mixed together, then step 102 may further include mixing the calcium bentonite clay, the illite clay, and/or the kaolinite clay together, along with atmospheric gases and/or moisture if included, in a pug mill for example. Pug mills are used to blend clay to a moist, workable consistency. The presence of admixed moisture and atmospheric gases, if any, is maximized while still maintaining a solid consistency. The composition of the invention may then be shredded. Shredding reduces the lump clay in size and may be accomplished by a disintegrator. The composition may then be desiccated. This may include drying the composition using a propane-fired, rotary dryer, fluid bed dryer, or vibrating grate dryer. Mixing, shredding, and desiccation techniques used in clay processing are well known to those of ordinary skill in the art.

Step 104 of method 100 is to crush the calcium bentonite clay, the illite clay, and the kaolinite clay mixture to form granules of the composition. Crushing may occur in stages. For example, primary crushing may reduce clay mixture size from as much as a cubic foot to a few cubic centimeters and may be accomplished using jaw, gyratory, or hammermill crushers. Secondary crushing may reduce the clay mixture further and may be accomplished by rotating pan crushers, cone crushers, tooth roll crushers, smooth roll crushers, and hammer mills. Crushing techniques used to crush clays are well known to those of ordinary skill in the art.

Turning to step 106 of method 100, the granules of the animal litter composition may be screened in order to sort out granules into various size groupings. Screening may be accomplished, for example, by using screens that are mechanically or electromagnetically vibrated. The granules may be screened any number of times to remove oversized and undersized components including as much dust removal as possible without water. Granular size and distribution for the granules useful herein are conveniently measured by screening a sample of the composition and determining the size and amount of material passed or retained by each of the differently sized mesh openings of the screens. For example, a mesh opening of 4# is equivalent to 4.75 mm$^2$, a mesh opening of 8# is equivalent to 2.36 mm$^2$, a mesh opening of 20# is equivalent to 0.92 mm$^2$, etc. Screening techniques used to sort clay granules are well known to those of ordinary skill in the art.

Any size or size range of granules of the animal litter composition of the invention may be produced. An animal litter having a given range of granule sizes may also differ in the distribution or proportion of granules having each particular size. Thus, the animal litter composition manufactured according to embodiments of the invention may be a mixture of differently sized granules, which is more absorbent than when all granules are the same size. However, the animal litter may be a mixture of similarly sized granules as well.

Accordingly, mixtures of different granule sizes allow for higher absorbency and different animal support characteristics (e.g. animal ground pressure support). For example, granule mixes with increased amounts of material sized in the 14–50 mesh range to maximize absorbency will be of advantage to animal litters requiring very high wicking capacities along with a reduced concern for a breakdown of product (attrition losses), such as in embodiments for litter boxes for small pets. While inclusion of fines (40 mesh granules or smaller) actually helps to increase the wicking capacity of an animal litter composition, in embodiments for equestrian uses the fines would need to be minimized or eliminated to avoid the potential for sand colic (sand ingestion and compaction in bowels).

In one embodiment of the invention, the granules of the animal litter composition may comprise a mixture of granule sizes from 4–14 mesh formed from approximately 8–14 mesh granules and approximately 4–8 mesh granules combined in a respective percentage by weight of approximately 60%:40%. In another embodiment of the invention, the granules of the animal litter composition may comprise a mixture of granule sizes from 4–20 mesh formed from approximately 8–20 mesh granules and approximately 4–8 mesh granules combined in a respective percentage by weight of approximately 50%:50%. This mixture allows for high absorbency while allowing larger granules to mask the presence of the smaller granules. That is, the 8–20 mesh granules exist in the intragranular spaces where they are hidden from view and incapable of being segregated and ingested by the animal.

In still another embodiment of the invention, the granules of the animal litter composition may comprise a mixture of granule sizes from 4–50 mesh formed from approximately 20–50 mesh granules and approximately 4–20 mesh granules combined in a respective percentage by weight of approximately 50%:50%. In yet another embodiment of the invention, the granules of the animal litter composition may comprise a mixture of granule sizes from 8–20 mesh formed from approximately 14–20 mesh granules and approximately 8–14 mesh granules combined in a respective percentage by weight of approximately 50%:50%. In one other embodiment of the invention, the granules of the animal litter composition may comprise a mixture of granule sizes from 8–50 mesh formed from approximately 20–50 mesh granules and approximately 8–20 mesh granules combined in a respective percentage by weight of approximately 50%:50%.

Those of ordinary skill in the art will understand the benefits and trade-off of hardness and absorbency resulting from various mixtures of mesh sizes and will be able to readily select an appropriate combination and distribution of mesh sizes for a particular application from the disclosure provided herein.

Step 108 of method 100 is to kiln the composition. Kilning may occur in stages, namely evaporation of free water, dehydration, oxidation/reduction, and vitrification, and may be accomplished using a propane-fired, stainless steel, rotary kiln or other kilns as known in the art. In addition, kilning may comprise either flash kilning or long term kilning.

Flash kilning may be carried out at a temperature of approximately 1,800° F. to approximately 2,000° F. for a time period of approximately 5–30 minutes depending upon the percentage of calcium bentonite in the mix for example. In a rotary kiln, there is a reduced possibility of granules insulating other granules from firing as granules are continuously rolling in the rotating kiln tube so that they come in contact with the flame multiple times per minute. If granules are left in the kiln for to long, the clay will vitrify completely or melt into a glass-like material and be of no use as an absorbent.

For a composition provided in the form of brick, tile, pottery, and the like products, kilning may be of a much longer term (i.e. up to twenty days) and may be carried out at a temperature of approximately 2,000° F. Kilning techniques for clay are well known to those of ordinary skill in the art.

Step 108 of kilning the composition may further comprise controlling $O_2$ input into the kiln during kilning to create an oxidizing or reducing atmosphere. This may be accomplished in a rotary kiln by reducing the amount of $O_2$ for the flame. A reducing atmosphere comprises an atmosphere with an excess of C, CO or $CO_2$. An oxidizing atmosphere comprises an atmosphere with an excess of $O_2$. Different oxidizing or reducing atmospheres may result in a differently fluxed animal litter composition of the invention depending upon color and strength/hardness requirements. In an oxidizing atmosphere, naturally occurring iron oxide minerals in the clays are oxidized to a reddish-brown color and help the clay mixture to achieve partial vitrification (the hardening, tightening and finally fusion or melting of the various clay components of the mixture) with the iron oxide acting as a flux (lowers the melting point of the mixture). Thus, partial vitrification occurs in the granules having the clay mixture but to a degree consistent with maintaining a high degree of porosity (absorbency) and a high hardness. In a reducing atmosphere, naturally occurring iron oxide minerals in the clays are not oxidized to a reddish-brown color and the composition has a gray coloration.

Figure 2:
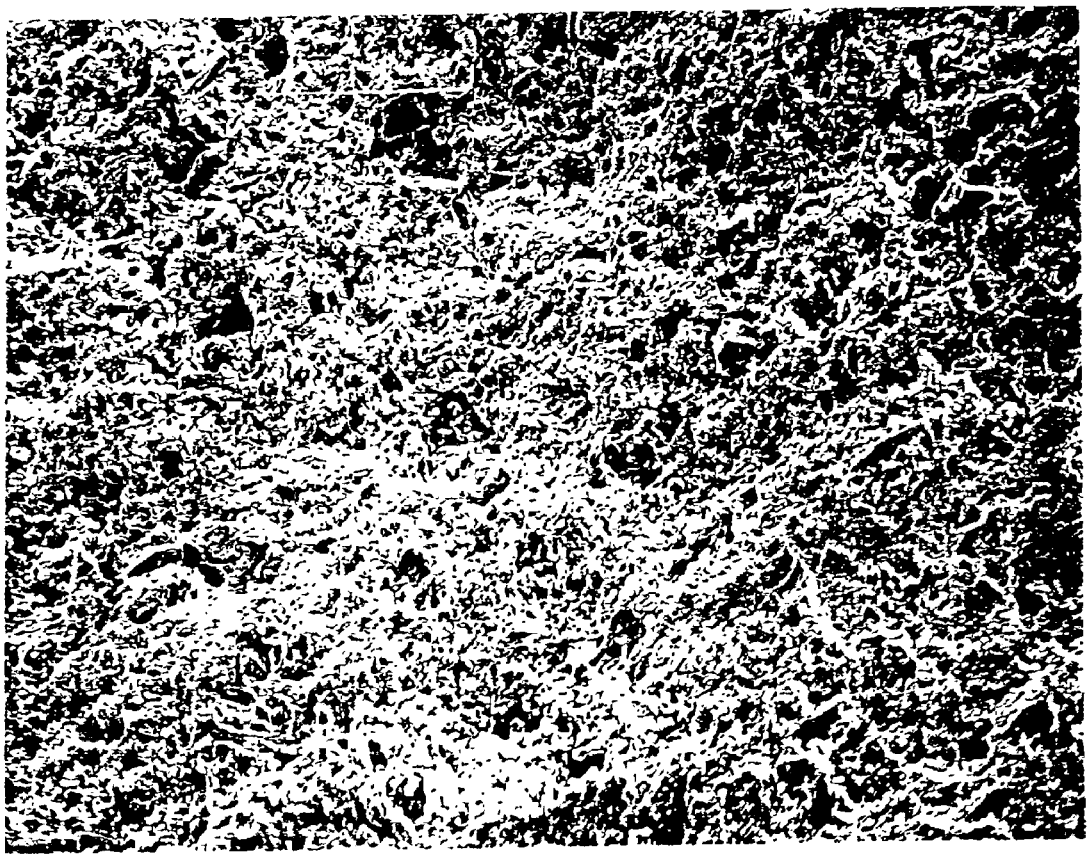
FIG. 2 is a SEM photomicrograph at 280× magnification illustrating an overall surface texture of a granule from an animal litter manufactured according to an embodiment of the invention.
Figure 3:
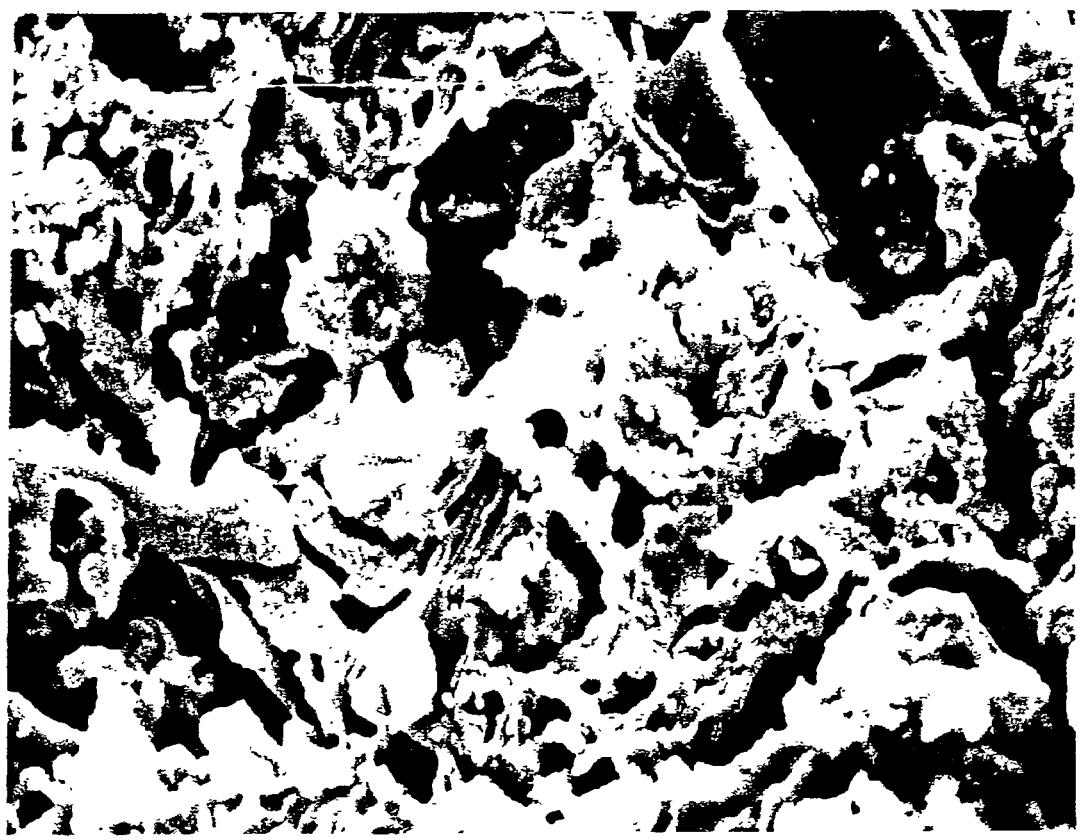
FIG. 3 is a SEM photomicrograph at 3,000× magnification illustrating micropores, microchannels, and their interconnections in the granule of FIG. 2.

Step 108 of kilning the composition may further comprise forming interconnecting micropores and microchannels in each of the granules for providing extensive permeability and porosity (absorbency). Accordingly, and for the exemplary purposes of this disclosure, FIGS. 2–3 depict a portion of a granule of an animal litter composition of the invention at different magnifications. FIG. 2 illustrates an overall surface texture of the granule, while FIG. 3 illustrates micropores, voids, and microchannels, and their interconnections in the granule. Micropores, voids, and microchannels may have any dimensions and may be measured in nanometers (nm), also known as millimicrons. For example, microchannels may range in opening size from approximately 100 nm to approximately 600 nm. Crevice-like voids may have opening sizes of up to approximately 80 nm. Each of the micropores may have an opening of approximately 0.1 nm to approximately 30 nm. If the micropores, voids, and microchannels were of only one size, they would have specific functions and not wide ranging applications to a variety of odorous gases (e.g. ammonia), salts, moistures, etc.

In one particular embodiment of the invention, the animal litter composition comprising the sized granules having calcium bentonite clay, illite clay, and kaolinite clay is flash kilned to bloat and/or expand the granules as admixed moisture and atmospheric gases are released. This release of moisture and gases forms a porous microstructure in the granules imparting to them a high level of micro and macro porosity. In another embodiment of the invention, animal litter may be formed with enhanced porous microstructure, similar to the structures depicted in the granule portion of FIGS. 2–3. Enhanced porous microstructure leads to enhanced absorbency and may be accomplished by admixtures of sacrificial materials, such as organic lints, organic dusts, and/or gas forming minerals to increase the extent and shapes of microstructures of the interconnecting micropores and microchannels in each of the granules. Organic lints from fibrous plants, organic dusts (e.g. composts), and gas forming minerals (e.g. coal dust, lignite dust, peat dust, sulfur containing compounds such as $FeS_4$ or Pyrite, etc.) are ground to a very fine size (e.g. 100 mesh or more) and pugmilled into the composition. The composition is then kilned to burn out these sacrificial materials. The sacrificial materials may be added up to approximately 50% by volume of the composition.

High absorbency is achieved as a result of the foregoing porosity enhancing techniques and the resulting microporosity and macroporosity of the granules. The combination of external surface area and internal porosity surface areas lead to very large lab calculated surface areas. In some embodiments of the invention, the animal litter composition may have a surface area of approximately 2,000,000 $ft^2/ft^3$ to approximately 40,000,000 $ft^2/ft^3$. In other embodiments, the animal litter composition may have a surface area of up to approximately 75,000,000 $ft^2/ft^3$ if acid activated or bloated by kilning. Approximate examples of surface areas of gravel, sand, diatomaceous earth, and an animal litter composition of the invention are illustrated in the following table for comparison:

| Gravel | Sand | Diatomaceous Earth | Animal Litter of the Invention |
|---|---|---|---|
| 600 ft²/ft³ | 1500 ft/ft³ | 200,000 ft²/ft³ | 2,000,000–75,000,000 ft²/ft³ |

Accordingly, an animal litter composition in accordance with embodiments of the invention may have superior absorbency. As just described, animal litter composition granules may be extremely porous. This microporosity and macroporosity makes the granules highly absorbent and gives them very large surface areas, thereby providing increased moisture and liquid storage potential and dissipation. The micropores and microchannels of the granules function as reservoirs for liquid, moisture, and some of the ammonia from animal waste. As such, animal litter compositions described herein have the increased ability to capture and then time-release moisture and some ammonia. The moisture and some of the ammonia may be forced into a closed end space in a granule's porous microstructure (e.g. a tunnel) and time is required for removal by dissipation. Additionally, animal litter compositions described herein have the increased ability to partition or degas off the bulk of ammonia almost immediately.

Figure 4:
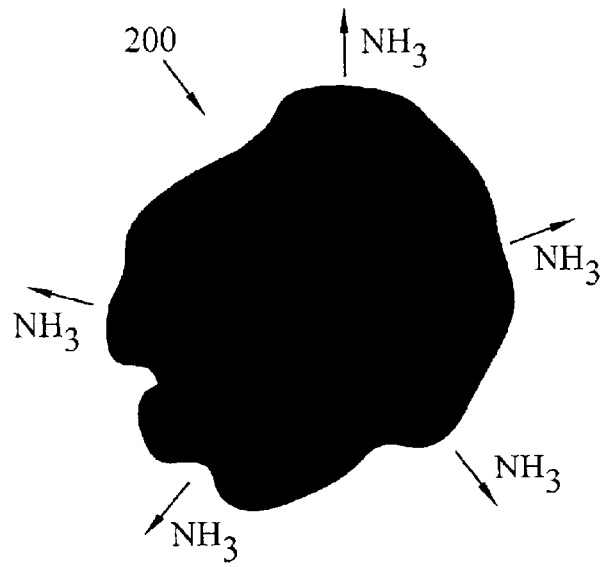
FIGS. 4–7 are front plan views of a hypothetical granule illustrating moisture/ammonia content states during the capture and release over time of moisture/ammonia by an animal litter manufactured according to an embodiment of the invention.
Figure 5:
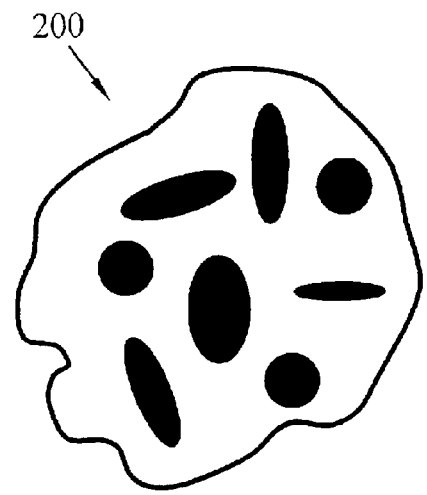

Accordingly, as exemplified in FIGS. 4–7, moisture/ammonia content states during the capture and release over time of moisture/ammonia for a hypothetical granule of a composition of an animal litter of the invention is illustrated. In particular, moisture and some ammonia from animal waste are absorbed into the porous microstructures of granule 200 through capillary action so that granule 200 is saturated as illustrated in FIG. 4 and not able to absorb any more. Granule 200 has a negative electron balance because of ionic substitution in its crystal lattice and lattice edge effects, which makes it a better absorber of some of the ammonia. The absorption of moisture from the animal fecal wastes leaves them desiccated, and desiccated animal fecal wastes are not as offensive in odor production as are moist animal fecal wastes. Therefore, the improved animal litter reduces wet spots in stalls or litter boxes, and in doing so chemically ties up or partitions off the bulk of ammonia in animal wastes. Partitioning of the moisture (e.g. water) and ammonia is based on closed versus open headspace testing (a way of creating a stall environment in a glass bottle, such as beaker or Erlenmeyer flask for example) commonly performed in the art to determine dissipation rates of gases. Ammonia and water are both polar compounds and ammonia readily dissolves or mixes into solution with water (i.e., ammonia loosely combines with water). Headspace tests illustrate that over time larger ammonia molecules are separated or partitioned (i.e., forced out of solution) from smaller water molecules (as illustrated in FIG. 4) by capillary action as the water and some ammonia is actively forced into the micropores and microchannels of granule microstructures (as illustrated in FIG. 5). Thus, the ammonia dissipates more rapidly than the water, which leads to a cleaner smelling stall or litter box.

Figure 6:
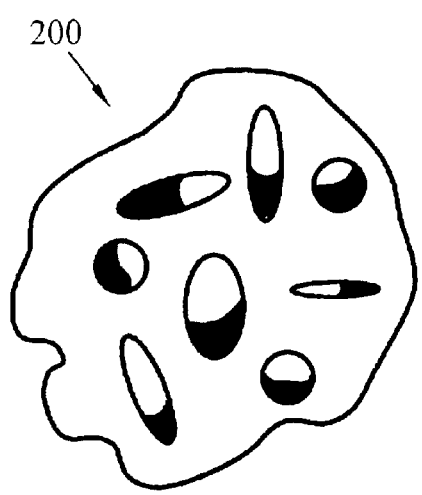
Figure 7:
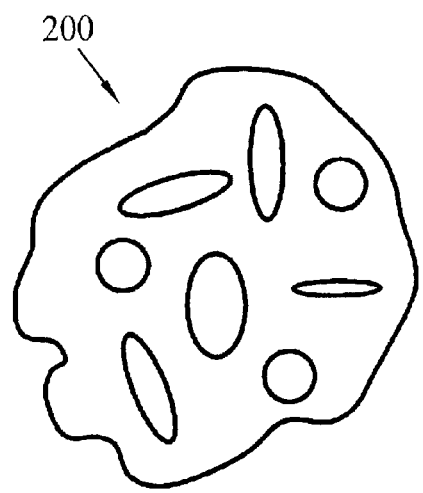

Over time and as illustrated sequentially in FIGS. 5–7, absorbed moisture and ammonia are gradually dissipated from the surface and porous structures of granule 200 with the result that moisture/odor is controlled along with a corresponding reduction in fly problems. In addition, ammonia released due to the combination of absorption and partitioning is less obnoxious. In any of the moisture/ammonia content states illustrated in FIGS. 5–7, granule 200 is able to absorb moisture/ammonia further.

Figure 8:
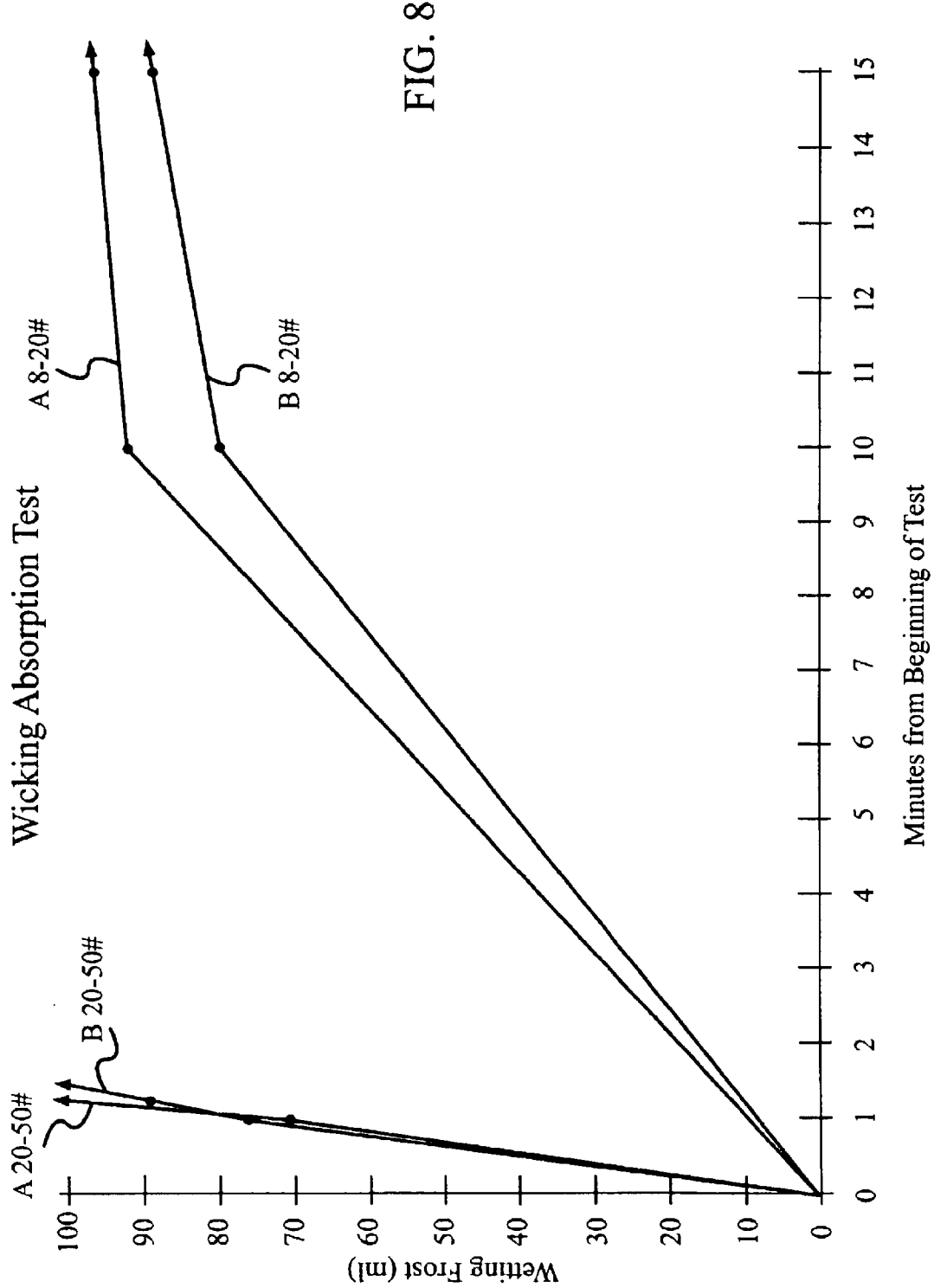
FIG. 8 a wicking graph comparing absorbency rates of two animal litter composition embodiments of the invention to absorbency rates of two conventional clinotillite zeolite products.

Turning to FIG. 8, a wicking graph comparing absorbency rates of two animal litter composition embodiments of the invention (i.e., A-8 mesh to 20 mesh; and A-20 mesh to 50 mesh) to absorbency rates of two conventional clinotillite zeolite products (i.e., B-8 mesh to 20 mesh; and B-20 mesh to 50 mesh) is illustrated. For purposes of this disclosure, an absorbency rate is a measure of the speed of movement of water (water front) as it is absorbed into a material (e.g. animal litter composition embodiments of the invention and conventional clinotillite zeolite products). A wicking test is accomplished by allowing water from a water bath to climb material in a standard, plastic, 52 mm inside diameter, 500 ml, graduated cylinder or column as is known in the art, such as one sold under the name PolyLab. Water enters the column through perforations in the base of the column. The perforations are of sufficient size and number to allow water from the bath to enter in the column, but not allow material to fall into the water bath. The wetting front in the material rises over time and is then plotted as distance versus time. Accordingly, as made clear in the graph, in the 8 mesh to 20 mesh size range, B has an absorption rate in a 52 mm diameter column of approximately 80 milliliters within 10 minutes, while A has a superior absorption rate in a 52 mm diameter column of approximately 90 milliliters or more within 10 minutes. In the 20 mesh to 50 mesh size range, B has an absorption rate in a 52 mm diameter column of approximately 76 milliliters within 1 minute, while A has an absorption rate in a 52 mm diameter column of approximately 70 milliliters or more within 1 minute. Thus, animal litter composition embodiments of the invention have superior absorption rates over conventional clinotillite zeolite products over time. These high absorption rates are what keep a stall or litter box clean and dry. In addition, as will be made clear, animal litter composition embodiments of the invention also have superior crush strength (i.e., superior hardness) over zeolite products and other conventional animal litters, thereby avoiding dust.

In some embodiments of the invention, the animal litter composition may have an absorption capacity of approximately 0.5 ml/g to approximately 2.5 ml/g. In other embodiments of the invention, the animal litter composition may have an absorption capacity of approximately 1.4 ml/g to approximately 1.9 ml/g. These absorption capacities are important because they illustrate the ability of animal litter composition embodiments of the invention to prevent moisture build-up from becoming a problem in a stall or liter box. For example, in a test using a 12' by 12' stall with a 4" flooring of an animal litter composition embodiment of the invention, the animal litter had a total intergranular water storage of 142 gallons.

Step 108 of kilning the composition may further harden the animal litter composition. Granules of animal litter in accordance with embodiments of the invention may be sufficiently hard with no tendency to break down in use (very high resistance to crushing/powdering under an animal's weight). In addition, with hard granules, there is less dust produced when the animals kick up the animal litter granules, or when a bag of litter is dumped out. Hardness is primarily a function of porosity. The more open the internal granule structure the lower the hardness.

The Los Angeles (LA) Abrasion test, or American Society for Testing and Materials (ASTM) C-131 test, is a standard method used to measure the hardness or degradation potential of clay. Results are obtained through a combination of actions including abrasion, attrition, impact, and grinding in a rotating steel drum. Approximately 30 grams of the clay may be placed in a rotating steel drum with five steel balls for 500 revolutions. After the prescribed number of revolutions, the contents are removed and the clay sieved to measure the degradation as percent loss. Smaller, more appropriate screens are used to sieve the animal litter composition granules as opposed to course, aggregate screens.

In some embodiments of the invention, the animal litter composition granules have an LA Abrasion hardness value of approximately 3 to approximately 60 (i.e., a maximum allowable loss of approximately 3% to approximately 60%). In other embodiments of the invention, the animal litter composition granules have an LA Abrasion hardness value of approximately 20 to approximately 35. For example, in an animal litter composition embodiment of the invention derived from a brick product comprising a mixture of calcium bentonite clay, illite clay, and kaolinite clay, granules have an LA Abrasion hardness value of approximately 31 to approximately 32.

An optional step of method 100 is to wash the composition. Washing may be accomplished by any technique known in the art and serves to remove dusts and fine materials remaining after previous processing. For example, washing may be accomplished on two vibrating screens with a high-pressure water spray bath.

Another optional step of method 100 is to add to the animal litter in accordance with embodiments of the invention any perfumes, water-soluble zinc salts, deodorants, odor absorbents, anti-microbial agents, disinfectants, colorants, pesticides and/or any combination thereof, in an amount sufficient to perform their intended functions substantially without decreasing hardness and absorbency. Those of ordinary skill in the art will understand the benefits from adding any combination of these materials and will be able to readily select an appropriate combination and distribution for a particular application.

Thus, animal litter in accordance with embodiments of the invention may be formed through the exemplary fabrication process 100 described above. Accordingly, an animal litter composition of the invention generally comprises granules having calcium bentonite clay, illite clay, and/or kaolinite clay. The granules may have high hardness coupled with high absorbency, thereby rendering the animal litter long lasting and durable, dust and odor free, easy to clean and maintain, and inexpensive in contrast to conventional animal litters.

The animal litter composition of the invention may be manufactured to produce a product with a lower unit density than conventional products. Particularly, the improved animal litter's density (approximately 20–70 lbs/ft$^3$ depending upon the percentage of fines and kilning) is lighter than sand or gravel (125 lbs/ft$^3$). This lower density caused by the designed porosity of the granules may also impart to the animal litter composition of the invention a lower thermal mass. A lower thermal mass equates to a cooler product when compared to heavier natural ground surfaces (i.e., sands and gravels) because of the heat loss mechanism provided by each granule's high surface area. In some embodiments of the invention, the animal litter composition may be manufactured in lower or higher density varieties to accomplish different end results (e.g. increased absorbency, lowered thermal mass, and reduced resistance to attrition). For example, a lower density is advantageous when hardness is not a concern or for geographic shipping.

Use of animal litter in accordance with embodiments of the invention results in lower medical, material, maintenance, and labor costs. For example, dust free animal litter lowers animal medical maintenance costs from respiratory and allergic reactions. In addition, by using animal litter in accordance with embodiments of the invention, an animal stays cleaner (i.e., the litter does not get tangled in the fur or coat of the animal).

In addition, the daily labor requirement for cleaning a stall or litter box is reduced because the animal litter may be easily maintained to a like new condition by a vacuum/ blower. Particularly, the animal litter's weight/volume is lighter than sand or gravel as previously described, but is heavier than shavings, sawdust, straw, and other less absorbent organic products, thereby allowing blowing and/or vacuuming as a stall cleaning option.

Furthermore, the animal litter is capable of remaining in place for long periods of time without replacement or maintenance/reconditioning due to its superior hardness and absorbency. The animal litter has been in actual stall tests where it has lasted six to twelve months. As needed, blowing and/or vacuuming may recondition the animal litter to its installed condition by removing fines introduced by animal waste breakdown.

The following example illustrates an exemplary fabrication process, analysis, and use of the present invention.

EXAMPLE

The manufacturing process of a horse litter composition embodiment of the invention begins with excavation of the appropriate raw clay types. Once the clay types are excavated, calcium bentonite, illite, kaolinite, and optionally other minor constituents are introduced into a pugmill with water and mixed to a homogenized composition.

The homogenized mixture is then shredded in a soil shredder to reduce the large clay pieces to more easily managed, smaller pieces. Next, the clay chunks are dried at a temperature of approximately 800° F. in a propane-fired, rotary dryer for a duration of approximately 5 minutes. Granules are then created by using the combination of a roll crusher and a hammermill, and associated dust collection is accomplished by a wetscrubber/baghouse combination vented from dust production points. Following their creation, granules are screened an a dry vibrating screen for sizing into desired size ranges, such as 4 mesh to 20 mesh.

Granules to be fired are then introduced into a propane-fired, stainless steel, rotary kiln where they are flash kilned at a temperature of 2,000° F. for five minutes. Next, the hot granules are dropped into a stock pile for cooling. After the granules have cooled, they are washed with water on a wet vibrating screen equipped with high pressure wash nozzles. Wet washed material is then transported by conveyor to a dewatering stock pile. Several days to a week is required for the entire stockpile to dewater (depending upon the size of the pile). Finally, the horse litter is packaged into one ton sacks or 50 lb. bags for transportation or bulk transportation.

Throughout this fabrication process, quality control is accomplished by lab testing a small batch of the horse litter composition embodiment of the invention further for chemical analysis, kilning, hardness, and absorbancy, among other characteristics. Thus, for example, the composition for use as horse litter may comprise a chemical analysis approximately as follows:

| Component | Approximate Percentage (%) of Weight |
|---|---|
| Calcium Bentonite | 48–8 |
| Illite | 11–12 |
| Kaolinite | 7–27 |
| Chlorite | 0–5 |
| Quartz | 10–29 |
| Calcite | 4–5 |
| K-Feldspar | 2–4 |
| Hematite | 12–0 |
| Plagioclase | 3–7 |
| Unaccounted materials | 3–3 |

Additionally, the horse litter composition is manufactured to produce a horse litter product with: a density of approximately 20–70 lbs/ft$^3$; a surface area of approximately 20,000,000–60,000,000 ft$^2$/ft$^3$; an absorption capacity of approximately 0.8–1.4 ml/g; absorption rate greater than approximately 100 milliliters within a first hour; and an LA Abrasion hardness value of approximately 20–30.

Describing a use of the horse litter composition embodiment of the invention further, the litter may be placed on the floor of a horse stall to a depth of approximately 4" to 8" or more in preparation for introducing a horse to the stall. The horse litter then absorbs and desiccates the animal waste deposited by the horse. The absorption of moisture from the horse fecal waste leaves it desiccated so that it is not as offensive in odor production as its moist counterpart. Over time, absorbed moisture and ammonia are dissipated from the surface and porous structures of the horse litter granules with the result that moisture/odor is controlled along with a corresponding reduction in fly problems. Therefore, the horse litter reduces wet spots in the stall, and in doing so chemically ties up or partitions off the bulk of ammonia in the horse's wastes leaving a clean and relatively odor free stall environment.

Additionally, because the horse litter composition granules are sufficiently hard, they have a very high resistance to crushing/powdering under the horse's weight. In addition, there is less dust produced when the horse kicks up the hard granules, or when horse litter is placed in the stall.

Moreover, the granule sizing reduces stall digging/pawing by the horse. The free-flowing ability of the granules discourages and eliminates the horse's digging efforts. As the horse attempts to dig in the litter, the hole continues to fill in with the free flowing granules.

Furthermore, during use, the horse litter does not get tangled in the horse's mane or tail and the horse's hooves stay better conditioned since the litter does not pack in the hoof frogs. In addition, the horse litter may be easily maintained to a like new condition by removing fines introduced by the horse's waste breakdown with a vacuum and/or blower so that the litter may remain in place for at least six to twelve months, if not longer.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. For example, those of ordinary skill in the art will understand that some of the structures, such as those in FIGS. 4–7, are shown in greatly exaggerated scale and are for illustrative purposes only. Similarly, any steps or sequence of steps of the method of the present invention indicated herein are given as examples of possible steps or sequence of steps and not as limitations, since numerous animal litter fabrication processes and sequences of steps may be used to produce an animal litter embodying the principles of the invention.

What is claimed is:

1. An animal litter composition comprising granules each having at least 3% by weight of calcium bentonite clay and at least 3% by weight of at least one of illite clay and kaolinite clay.

2. The composition of claim 1, wherein the calcium bentonite clay and the one of the illite clay and the kaolinite clay are respectively combined in a percentage by weight of approximately 85%:15% to approximately 15%:85%.

3. The composition of claim 1, wherein the composition has an LA Abrasion hardness value of approximately 3 to approximately 60.

4. The composition of claim 1, wherein the composition has an LA Abrasion hardness value of approximately 20 to approximately 35.

5. The composition of claim 1, wherein the composition has an absorption capacity of approximately 0.5 ml/g to approximately 2.5 ml/g.

6. The composition of claim 1, wherein the composition has an absorption capacity of approximately 1.4 ml/g to approximately 1.9 ml/g.

7. The composition of claim 1, wherein the composition has an absorption rate in a 52 mm diameter column of approximately 90 milliliters or more within 10 minutes.

8. The composition of claim 7, wherein the composition has an absorption rate in a 52 mm diameter column of approximately 70 milliliters or more within 1 minute.

9. The composition of claim 1, wherein the composition has a surface area of approximately 2,00,000 ft2/ft3 to approximately 75,000,000 ft2/ft3.

10. The composition of claim 1, wherein the composition has a surface area of approximately 20,000,000ft2/ft3 to approximately 40,000,000 ft2/ft3.

11. The composition of claim 1, wherein at least a portion of the granules each have interconnecting micropores, microchannels, and voids for providing permeability and porosity.

12. The composition of claim 11, wherein each of the micropores has an opening length of approximately 0.1 nm to approximately 30 nm, wherein each of the microchannels has an opening length of approximately 100 nm to approximatly 600 nm, and wherein each of the voids has an opening length of approximately 30 nm to approximately 80 nm.

13. The composition of claim 1, wherein the granules further comprise a mixture of granules sized from approximately 4 mesh to approximately 14 mesh.

14. The composition of claim 13, wherein the mixture of granules is formed from a combination of granules sized from approximately 8 mesh to approximately 14 mesh and granules sized from approximately 4 mesh to approximately 8 mesh in a percentage by weight of approximately 60%:40%.

15. The composition of claim 1, wherein the granules further comprise a mixture of granules sized from approximately 4 mesh to approximately 20 mesh.

16. The composition of claim 15, wherein the mixture of granules is formed from a combination of granules sized from approximately 8 mesh to approximately 20 mesh and granules sized from approximately 4 mesh to approximately 8 mesh in a percentage by weight of approximately 50%:50%.

17. The composition of claim 1, wherein the granules further comprise a mixture of granules sized from approximately 4 mesh to approximately 50 mesh.

18. The composition of claim 17, wherein the mixture of granules is formed from a combination of granules sized from approximately 20 mesh to approximately 50 mesh and granules sized from approximately 4 mesh to approximately 20 mesh in a percentage by weight of approximately 50%:50%.

19. The composition of claim 1, wherein the granules further comprise a mixture of granules sized from approximately 8 mesh to approximately 20 mesh.

20. The composition of claim 19, wherein the mixture of granules is formed from a combination of granules sized from approximately 14 mesh to approximately 20 mesh and granules sized from approximately 8 mesh to approximately 14 mesh in a percentage by weight of approximately 50%:50%.

21. The composition of claim 1, wherein the granules further comprise a mixture of granules sized from approximately 8 mesh to approximately 50 mesh.

22. The composition of claim 21, wherein the mixture of granules is formed from a combination of granules sized from approximately 20 mesh to approximately 50 mesh and granules sized from approximately 8 mesh to approximately 20 mesh in a percentage by weight of approximately 50%:50%.

23. The composition of claim 1, wherein the composition has a density of approximately 20 lbs/ft3 to approximately 70 lbs/ft3.

24. An animal litter composition comprising granules each least having at least 3% by weight of calcium bentonite clay, at least 3% by weight of illite clay, and at least 3% by weight of kaolinite clay.

25. The composition of claim 24, wherein the calcium bentonite clay, the illite clay, and the kaolinite clay are respectively combined in a percentage by weight of approximately 72%:17%:11% to approximately 15%:29%:56%.

26. The composition of claim 24, the granules further having chlorite clay, quartz, calcite, K-feldspar, hematite, plagioclase, and unaccounted materials.

27. The composition of claim 26, wherein the calcium bentonite clay, the illite clay, the kaolinite clay, the chlorite clay, the quartz, the calcite, the K-feldspar, the hematite, the plagioclase, and the unaccounted materials are respectively combined in a percentage by weight of approximately 48%:11%:7%:0%:10%:4%:2%:12%:3%:3% to approximately 8%:12%:27%:5%:29%:5%:4%:0%:7%:3%.

28. The composition of claim 24, wherein the composition has an LA Abrasion hardness value of approximately 3 to approximately 60.

29. The composition of claim 24, wherein the composition as an LA Abrasion hardness value of approximately 20 to approximately 35.

30. The composition of claim 24, wherein the composition has an absorption capacity of approximately 0.5 ml/g to approximately 2.5 ml/g.

31. The composition of claim 24, wherein the composition has an absorption capacity of approximately 1.4 ml/g to approximately 1.9 ml/g.

32. The composition of claim 24, wherein the composition has an absorption rate in a 52 mm diameter column of approximately 90 milliliters or more within 10 minutes.

33. The composition of claim 32, wherein the composition has an absorption rate in a 52 mm diameter column of approximately 70 milliliters or more within 1 minute.

34. The composition of claim 24, wherein the composition has a surface area of approximately 2,00,000 ft2/ft3 to approximately 75,000,000 ft2/ft3.

35. The composition of claim 24, wherein the composition has a surface area of approximately 20,000,000 ft2/ft3 to approximately 40,000,000 ft2/ft3.

36. The composition of claim 24, wherein at least a portion of the granules each have interconnecting micropores, microchannels, and voids for providing permeability and porosity.

37. The composition of claim 36, wherein each of the micropores has an opening length of approximately 0.1 nm to approximately 30 nm, wherein each of the microchannels has an opening length of approximately 100 nm to approximately 600 nm, and wherein each of the voids has an opening length of approximately 30 nm to approximately 80 nm.

38. The composition of claim 24, wherein the granules further comprise a mixture of granules sized from approximately 4 mesh to approximately 14 mesh.

39. The composition of claim 38, wherein the mixture of granules is formed from a combination of granules sized from approximately 8 mesh to approximately 14 mesh and granules sized from approximately 4 mesh to approximately 8 mesh in a percentage by weight of approximately 60%:40%.

40. The composition of claim 24, wherein the granules further comprise a mixture of granules sized from approximately 4 mesh to approximately 20 mesh.

41. The composition of claim 40, wherein the mixture of granules is formed from a combination of granules sized from approximately 8 mesh to approximately 20 mesh and granules sized from approximately 4 mesh to approximately 8 mesh in a percentage by weight of approximately 50%:50%.

42. The composition of claim 24, wherein the granules further comprise a mixture of granules sized from approximately 4 mesh to approximately 50 mesh.

43. The composition of claim 42, wherein the mixture of granules is formed from a combination of granules sized from approximately 20 mesh to approximately 50 mesh and granules sized from approximately 4 mesh to approximately 20 mesh in a percentage by weight of approximately 50%:50%.

44. The composition of claim 24, wherein the granules further comprise a mixture of granules sized from approximately 8 mesh to approximately 20 mesh.

45. The composition of claim 44, wherein the mixture of granules is formed from a combination of granules sized from approximately 14 mesh to approximately 20 mesh and granules sized from approximately 8 mesh to approximately 14 mesh in a percentage by weight of approximately 50%:50%.

46. The composition of claim 24, wherein the granules further comprise a mixture of granules sized from approximately 8 mesh to approximately 50 mesh.

47. The composition of claim 46, wherein the mixture of granules is formed from a combination of granules sized from approximately 20 mesh to approximately 50 mesh and granules sized from approximately 8 mesh to approximately 20 mesh in a percentage by weight of approximately 50%:50%.

48. The composition of claim 24, wherein the composition has a density of approximately 20 lbs/ft3 to approximately 70 lbs/ft3.

49. An animal litter composition comprising:
granules at least a portion of which each have interconnecting micropores and microchannels for providing permeability and porosity;
an LA Abrasion hardness value of approximately 3 to approximately 35; and
an absorption capacity of approximately 0.5 ml/g to approximately 2.5 ml/g.

50. The composition of claim 49 further comprising an absorption rate in a 52 mm diameter column of approximately 90 milliliters or more within 10 minutes.

51. The composition of claim 50 further comprising an absorption rate in a 52 mm diameter column of approximately 70 milliliters or more within 1 minute.

52. The composition of claim 49 further comprising a surface area of approximately 20,000,000 ft2/ft3 to approximately 75,000,000 ft2/ft3.

53. The composition of claim 49, wherein the granules corn rise a mixture of granules sized from approximately 4 mesh to approximately 20 mesh.

54. The composition of claim 53, wherein the mixture of granules is formed from a combination of granules sized from approximately 8 mesh to approximately 20 mesh and granules sized from approximately 4 mesh to approximately 8 mesh in a percentage by weight of approximately 50%:50%.

55. The composition of claim 49, wherein each of the micropores has an opening length of approximately 0.1 nm to approximately 30 nm, and wherein each of the microchannels has an opening length of approximately 100 nm to approximately 600 nm.

56. A method of fabricating an animal litter composition comprising granules having a minimum hardness and a minimum porosity, wherein the method comprises the steps of:
admixing sacrificial material to a composition mixture;
forming the composition mixture into the granules; and
flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing the minimum porosity, and thereby partially vitrifying the at least a portion of the granules for providing the minimum hardness;
wherein the step of admixing sacrificial material further comprises admixing at least one of a gas forming mineral, an organic lint, and any combination thereof to the composition mixture.

57. The method of claim 56, wherein the step of flash kilning the granules further comprises forming each of the micropores with an opening length of approximately 0.1 nm to approximately 30 nm and forming each of the microchannels with an opening length of approximately 100 nm to approximately 600 nm.

58. The method of claim 56, wherein the step of flash kilning the granules further comprises flash kilning at a temperature and for a duration to obtain LA Abrasion hardness value of approximately 3 to approximately 60.

59. The method of claim 56, wherein the step of flash kilning the granules further comprises flash kilning at a temperature and for a duration to obtain absorption capacity of approximately 0.5 ml/g to approximately 2.5 ml/g.

60. The method of claim 56, wherein the step of kilning the granules further comprises flash kilning at a temperature and for a duration to obtain an absorption rate in a 52 mm diameter column of approximately 90 milliliters or more within 10 minutes.

61. A method of fabricating an animal litter composition comprising granules having a minimum hardness and a minimum porosity, wherein the method comprises the steps of:
admixing sacrificial material to a composition mixture;
forming the composition mixture into the granules; and
flash kilning the granules at a temperature of approximately 1,800° F. to approximately 2,000° F. for a duration of approximately 5 minutes to approximately 30 minutes to release and burn out at least a portion of the sacrificial material, thereby bloating at least a portion of the granules and forming a porous microstructure of interconnecting micropores and microchannels in each of the at least a portion of the granules for providing th minimum porosity, and thereby partially vitrifying the at least a portion of the granules for providing the minimum hardness;
wherein the step of admixing sacrificial material further comprises admixing at least one of a gas forming mineral, an organic lint, an organic dust, and any combination thereof to the composition mixture.

* * * * *

UNITED STATES PATENT AND TRADEMARK OFFICE
CERTIFICATE OF CORRECTION

PATENT NO. : 6,854,421 B2
APPLICATION NO. : 10/120858
DATED : February 15, 2005
INVENTOR(S) : Opfel It is certified that error appears in the above-identified patent and that said Letters Patent is hereby corrected as shown below:

Claim 53 should read: -- The composition of claim 49, wherein the granules comprise a mixture of granules sized from approximately 4 mesh to approximately 20 mesh.--

Claim 58 should read: -- The method of claim 56, wherein the step of flash kilning the granules further comprises flash kilning at a temperature and for a duration to obtain an LA Abrasion hardness value of approximately 3 to approximately 60. --

Claim 59 should read: --The method of claim 56 wherein the step of flash kilning the granules further comprises flash kilning at a temperature and for a duration to obtain an absorption capacity of approximately 0.5 ml/g to approximately 2.5 ml/g. --

Claim 61 should read: -- A method of fabrication an animal litter composition comprising granules having a minimum hardness and a minimum porosity, wherein the method comprises the steps of:

admixing sacraficial material to a composition mixture;

forming the composition mixture into the granules; and flash kilning the granules at a temperature of approximately 1,800 F to approximately 2,000 F for a duration of approximately 5 minutes to approximately 30 minutes to release the granules and burn out at least a portion of the sacrificial material, thereby bloating at least a portion of the granules and forming microstructure of interconneting micropores and microchannels in each of the at least a portion of the granules for providing the minimum porosity, and thereby partially virtrifying the at least a portion of the granules for providing the minimum hardness;

UNITED STATES PATENT AND TRADEMARK OFFICE
CERTIFICATE OF CORRECTION

PATENT NO. : 6,854,421 B2
APPLICATION NO. : 10/120858
DATED : February 15, 2005
INVENTOR(S) : Opfel It is certified that error appears in the above-identified patent and that said Letters Patent is hereby corrected as shown below:

wherein the step of admixing sacrifical material further comprises admixing at least one of a gas forming, an organic lint, an organic dust, and any combination thereof to the composition mixture.

Signed and Sealed this

Twenty-sixth Day of December, 2006

JON W. DUDAS
*Director of the United States Patent and Trademark Office*